United States Patent
Griffin et al.

(10) Patent No.: US 11,245,584 B2
(45) Date of Patent: Feb. 8, 2022

(54) SOFTWARE DEFINED NETWORK OPTIMIZATION USING QUANTUM COMPUTING

(71) Applicant: Red Hat, Inc., Raleigh, NC (US)

(72) Inventors: Leigh Griffin, Waterford (IE); Luigi Zuccarelli, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 83 days.

(21) Appl. No.: 16/160,632

(22) Filed: Oct. 15, 2018

(65) Prior Publication Data

US 2020/0119987 A1  Apr. 16, 2020

(51) Int. Cl.
*H04L 12/24* (2006.01)
*H04L 29/08* (2006.01)
*G06N 10/00* (2019.01)

(52) U.S. Cl.
CPC ......... *H04L 41/0823* (2013.01); *G06N 10/00* (2019.01); *H04L 67/303* (2013.01)

(58) Field of Classification Search
CPC .... H04L 41/0823; H04L 67/303; G06N 10/00
USPC ....................................................... 709/220
See application file for complete search history.

(56) References Cited

U.S. PATENT DOCUMENTS

| | | | | |
|---|---|---|---|---|
| 7,451,292 | B2* | 11/2008 | Routt | B82Y 10/00 712/14 |
| 8,085,689 | B2* | 12/2011 | Pujet | H04L 41/0826 370/235 |
| 8,365,164 | B1* | 1/2013 | Morgenstern | G06F 9/44552 717/108 |
| 8,966,635 | B2* | 2/2015 | Dewey | G06F 21/54 726/25 |
| 9,663,358 | B1* | 5/2017 | Cory | G06N 10/00 |
| 10,439,867 | B2* | 10/2019 | Wohlert | H04L 67/30 |
| 10,567,169 | B2* | 2/2020 | Hong | H04L 9/0858 |
| 2006/0143157 | A1* | 6/2006 | Landsman | G06F 40/205 |
| 2008/0140749 | A1* | 6/2008 | Amato | B82Y 10/00 708/490 |
| 2019/0102220 | A1* | 4/2019 | Bishop | G06F 9/5072 |
| 2020/0074346 | A1* | 3/2020 | Griffin | G06N 10/00 |

(Continued)

FOREIGN PATENT DOCUMENTS

WO  2017144876 A1  8/2017

OTHER PUBLICATIONS

Aggour et al., Simulating Quantum Computing: Quantum Express, Proceedings of the 2003 Winter Simulation Conference, 932-40 (2003) (Year: 2003).*

(Continued)

*Primary Examiner* — David P Zarka
(74) *Attorney, Agent, or Firm* — Lowenstein Sandler LLP

(57) ABSTRACT

Aspects of the disclosure provide for mechanisms for networking optimization using quantum computing. A method of the disclosure includes: receiving profile information of software defined network, wherein the profile information comprises information about a current configuration of the software defined network; generating, in view of the profile information, an optimization algorithm for optimizing the software defined network; and generating, by a processing device, a plurality of quantum instructions for implementing the optimization algorithm.

12 Claims, 10 Drawing Sheets

(56) References Cited

U.S. PATENT DOCUMENTS

2021/0192114 A1* 6/2021 Boixo Castrillo .. G06F 30/3308

OTHER PUBLICATIONS

Kelly, Simulating Quantum Computers Using OpenCL, 1-13 (Nov. 9, 2018) (Year: 2018).*
Yongqiang Yang et al., "A Dynamic Deployment Policy of Slave Controllers for Software Defined Network", Sensors & Transducers, vol. 195, Issue 12, Dec. 2015, pp. 77-82 (6 pages).

* cited by examiner

1000

```
1013    // include base library (gate definitions)
        include "qelib1.inc";
1011    // define qubit size
        qreg q[2];
        // define measurement registers
        creg c[2];

1015    // hardmard gate – set to superposition
        h q[0];
1017    // x gate – flip the state
        x q[1];
1019    // cnot gate – set the qubits to the bell state (entangled state)
        cx q[0],q[1];
        //make the measurements
        measure q[0] -> c[0];
        measure q[1] -> c[1];
1021    // Decorated Metadata for use by other services
1023    // frequency 20
        // modification_timestamp 20180101
```

FIG. 10

SOFTWARE DEFINED NETWORK OPTIMIZATION USING QUANTUM COMPUTING

TECHNICAL FIELD

The implementations of the disclosure generally relate to computer systems and, more specifically, to optimizing software defined networks using quantum computing.

BACKGROUND

Quantum computers perform computations utilizing quantum-mechanical phenomena, such as superposition and entanglement. Unlike classical computers that process data encoded in binary bits, each of which is always in one of two definite states ("0" or "1"), quantum computers process data in units of quantum bits (qubits) that can be in superpositions of states. "Superposition" refers to the ability of each qubit to represent both a "1" and a "0" at the same time. The qubits in a superposition can be correlated with each other (referred to as "entanglement"). That is, the state of a given qubit (whether it is a "1" or a "0") can depend on the state of another qubit. A quantum computer with N qubits can be in a superposition of up to $2^N$ states simultaneously. Compared to the classical computers that can only be in one of these $2^N$ states at a particular time, quantum computers have higher compute power and may solve difficult problems that are intractable using the classical computers.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 10 illustrates an example of a quantum assembly file in accordance with some embodiments of the present disclosure.

DETAILED DESCRIPTION

Figure 1:
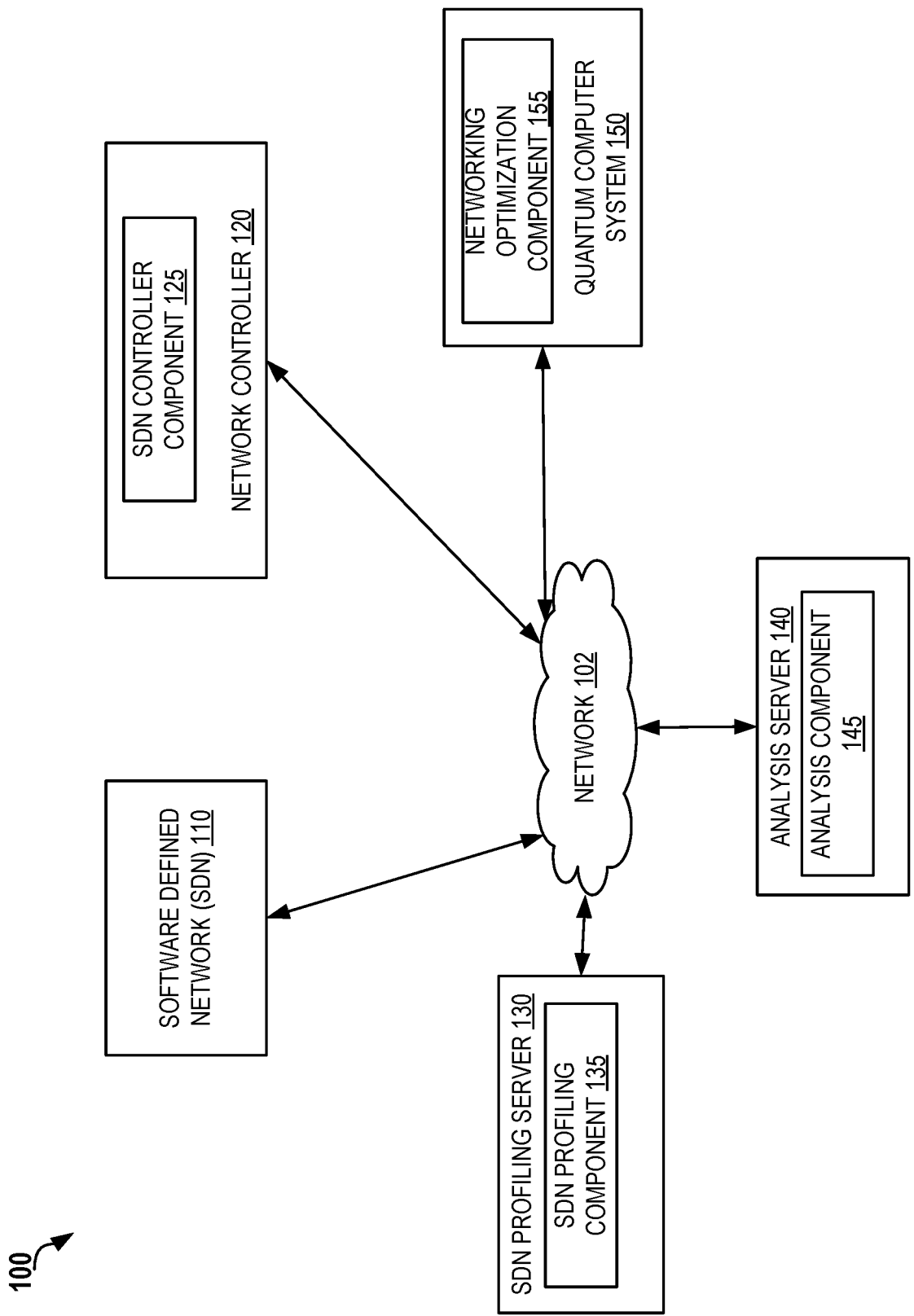
FIG. 1 is a block diagram of a network architecture in which implementations of the disclosure may operate.

A software defined network (SDN) may include one or more computer networks. Each of the computer networks may include various computing devices that may communicate with one another through network switches and other network devices. One or more components of the SDN may perform data path functions, while one or more components of the SDN may perform control path functions. The SDN may implement an architecture that decouples the network control and forwarding functions, thus enabling the network control to become directly programmable and the underlying infrastructure to be abstracted for applications and network services. In certain implementations, the SDN may separate the control plane of a network from the data plane of the network. The control plane of the network sets policies that control the flow of traffic through components of the network. Components in the data plane of the network use the policies set by the control plane to distribute traffic in the network. The control plane of an SDN may include a network controller that sets the policies of the network and provides the policies to components in the data plane. Each component of the network may be regarded as a node of the network.

Managing the SDN may involve solving complex optimization problems in view of various constraints and requirements that arise in practice, such as limited TCAM (ternary cached addressable memory), link capacities (e.g., link bandwidths), middlebox CPU and memory capacities, requirements of different SDN applications (e.g., traffic engineering, policy steering, load balancing, topology management, etc.), etc. For example, the network controller may need to determine paths that traffic might travel in the SDN in view of the constraints and requirements. Prior solutions for SDN optimization used algorithms implemented by classical computers (e.g., OSPF (Open Shorted Path First)) to solve the optimization problems. Performing networking optimization using such algorithms may be computationally expensive and inefficient given that the number of paths in the SDN grows exponentially with the size of the SDN. As a result, the prior solutions for SDN optimization may have to perform infrequent and offline preprocessing to manage and/or optimize the SDN.

Aspects of the present disclosure address the above deficiencies and other deficiencies of conventional SDN optimization mechanisms by providing optimization mechanisms (e.g., systems, methods, computer-readable medium, etc.) for performing SDN optimization using quantum computing.

Quantum computing utilizes quantum-mechanical phenomena, such as superposition and entanglement. Quantum computing may involve initializing the quantum states of a set of qubits, allowing the quantum states of the qubits to evolve under the influence of quantum gates, and observing (e.g., measuring) the qubits after they have evolved. As referred to herein, a qubit (or "quantum bit") is a basic unit of quantum information that can be used in quantum computing. The qubit may be regarded as a quantum system that exists in quantum superpositions of two independent quantum states. The probability that the quantum system is in either quantum state is not zero. An example of such a quantum system is the spin of an electron, wherein the up or down spin can correspond to a zero, a one, or a superposition of states in which it is both up and down at the same time. The spin-up state and the spin-down state may be referred to as the state of "$|0\rangle$" and the state of "$|1\rangle$," respectively. Performing a calculation using the electron involves performing the calculation simultaneously for both a zero and a one. As such, the qubit can be both a zero and a one at the same time. The qubit can be in one or more quantum states, such as the state of "$|0\rangle$," the state of "$|1\rangle$," or a linear combination of the states of "|0>" and "|1>" (a superposition of the states of "|0>" and "|1>"). N qubits may provide a system with a state that is a combination of $2^N$ states simultaneously.

As referred to herein, a quantum gate may be a logic gate operating on one or more qubits. Applying the logic gate to the one or more qubits may be regarded as performing one or more operations defined by linear algebra over Hilbert space and represented by unitary matrices. The quantum gate may be reversible (e.g., receiving an input of n-bit data and returning an output of n-bit data). The quantum gate may control the evolution of distinguishable quantum states of the qubits and define calculations corresponding to the evolution. This evolution may be regarded as performing $2^N$ simultaneous calculations. The output of the quantum gate may be determined by measuring the quantum states of the qubits after the evolution. Examples of the quantum gate may include a Hadamard gate, a Pauli-X gate, a Pauli-Y gate, a Pauli-z gate, a swap gate, a phase shift gate, etc. A quantum gate operating on one qubit may be referred to as a "single-qubit gate" herein. A quantum gate operating on multiple qubits may be referred to as a "multi-qubit gate" herein.

As referred to herein, "quantum computing device" or "quantum computer" may be a device that is capable of performing quantum computing. A quantum computing device may implement a quantum algorithm defined by a sequence of quantum gates and initial values of one or more qubits. The implementation of the algorithm may end with a measurement, collapsing the system of qubits into one of $2^N$ states, where each of the qubits is zero or one. The algorithm may implement any suitable function. Examples of the algorithm may include an algorithm for public-key cryptography, an algorithm for searching for a specified entry (e.g., an entry of specified features) in an unordered data set, an algorithm for setting two qubits in an entangled state, an algorithm for determining the exclusive-or (XOR) mask over which a given black-box function is invariant, etc.

The optimization mechanisms described herein can obtain profile information representative of a current configuration of an SDN. The profile information may represent a snapshot of the current configuration of the SDN and may include information about one or more nodes of the SDN (e.g., IP (Internet Protocol) addresses of the network switches and other components of the SDN), presence or absence of a connection between two or more of the nodes, current packet forwarding rules and/or policies implemented in the SDN, one or more distribution tables defining the rules and/or policies, and/or any other suitable information related to networking capabilities and statistics of the SDN. The SDN may be a running system in some embodiments.

The optimization mechanisms can generate, in view of the profile information of the SDN, an optimization algorithm executable by a quantum computer system. The optimization algorithm may be executed to optimize one or more aspects of the current configuration of the SDN. For example, the optimization algorithm may be executed to generate one or more optimal paths for forwarding data in the SDN. The optimization algorithm may include a plurality of quantum gates corresponding to a plurality of possible edges in the SDN. A given edge of the possible edges may connect an origin node and a destination node of the SDN. The presence of a given edge may represent that data can be forwarded from the origin node to the destination node. The absence of the given edge may represent that data cannot be forwarded from the origin node to the destination node.

Enabling the given edge in the SDN may be simulated by performing one or more operations employing one or more quantum gates. Disabling the given edge in the SDN may be simulated by turning off the quantum gates (e.g., by flipping the state of the quantum gate(s)) during the execution of the optimization algorithm. As such, each possible edge in the SDN may be represented using one or more quantum gates.

The optimization algorithm may also include generating a plurality of possible paths in the SDN by selectively employing one or more of the quantum gates corresponding to the possible edges. Each of the possible paths may represent a routing path via which data can be forwarded from an origin node to a destination node in the SDN. For example, generating a first path between a first node and a second node of the SDN may correspond to employing one or more first quantum gates to simulate one or more first edges that connect the first node, the second node, and/or one or more other nodes of the SDN. As another example, generating a second path between the first node and the second node of the SDN may correspond to employing one or more second quantum gates to simulate one or more second edges that connect the first node, the second node, and/or one or more other nodes of the SDN.

The optimization algorithm may also involve selecting one or more of the possible paths as optimal paths. The selection can be made by identifying one or more of the possible paths that satisfy one or more conditions (e.g., a hop limit, a shortest path, an optimal cost, resource constraints, etc.). In some embodiments, the selection of the optimal paths may be made utilizing the Grover's algorithm that searches for a specified entry (e.g., an entry of specified features) in an unordered data set of N entries, using $O\sqrt{N}$ queries. As such, the selection of the optimal paths by executing the optimization algorithm achieves quadratic speedup over classical algorithm that need O(N) queries to make the same selection.

The optimization mechanisms can generate one or more quantum instructions for implementing the optimization algorithm. For example, the optimization mechanisms can generate one or more quantum assembly files (e.g., Quantum Assembly Language (QASM) files) for implementing the optimization algorithm. The quantum instructions can be executed by a quantum computer system to produce one or more optimization results. Each of the optimization results may correspond to an output of the execution of the quantum instructions by the quantum computer system. The optimization results may include one or more optimal paths for forwarding data in the SDN. As described above, a quantum computer system with N qubits can be in a superposition of up to $2^N$ states simultaneously. As such, the quantum computer system can explore $2^N$ possibilities simultaneously. Executing the optimization algorithm using the quantum computer system may enable the optimization mechanisms disclosed herein to evaluate all possible paths in the SDN and to select optimal paths from the possible paths efficiently and in a timely manner.

The optimization mechanisms can provide the optimization results to a network controller that manages the SDN (e.g., by providing one or more configuration files including the optimization results). The network controller can reconfigure the SDN in view of the optimization results (e.g., by deploying a new SDN in view of the configuration files).

Accordingly, aspects of the present disclosure provide for mechanisms that enhance speed, efficiency, and performance of a software defined network. Compared to conventional networking optimization mechanisms that rely on infrequent and offline preprocessing by classical computers to manage and optimize software defined networks, the mechanisms disclosed herein perform networking optimization by evaluating possible paths in an SDN using quantum computing. This may provide cost-effective, simplified, and high frequency optimization of a running SDN, resulting in accurate and efficient networking optimization with an auto deploy option to reconfigure the SDN in real time. The optimization mechanisms described herein can allow for analysis and recreation of the SDN, via quantum computing, on certain triggers (e.g., a new service route) or periodically to ensure that the SDN is running optimally.

FIG. 1 is a block diagram of an example of a computer system 100 according to some embodiments of the present disclosure. As illustrated, the computer system 100 may include a software defined network (SDN) 110, a network controller 120, an SDN profiling server 130, an analysis server 140, a quantum computer system 150, and/or any other suitable component in accordance with the present disclosure. The quantum computer system may include any suitable number of quantum computers.

The components of the computer system 100 may be connected via a network 102, which may be a private network (e.g., a local area network (LAN), a wide area network (WAN), intranet, or other similar private networks) or a public network (e.g., the Internet).

Each of the quantum computer system 110A-110b, the clients 120A-120N, the hardware profiling server 130, the analysis server 140, the proxy routing server 150, and the scheduler server 160 may include a server, a workstation, a personal computer (PC), a mobile phone, a palm-sized computing device, a personal digital assistant (PDA), and/or any other suitable computing device. "Computing device" as used herein may be and/or include a device comprising one or more processors, one or more memory devices, and one or more input/output (I/O) interfaces. A computer system may be a system including one or more computing devices.

"Processor" or "processing device" as used herein may be and/or include a device capable of executing instructions encoding arithmetic, logical, or I/O operations. In one illustrative example, a processor may follow a Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. According to another aspect of the disclosure, a processor may be implemented as a single integrated circuit, two or more integrated circuits, or may be a component of a multi-chip module (e.g., in which individual microprocessor dies are included in a single integrated circuit package and hence share a single socket). A processor may also be a central processing unit (CPU) in some embodiments.

"Memory device" herein may be and/or include a volatile or non-volatile memory device, such as RAM (random-access memory), ROM (read-only memory), EEPROM (electrically erasable programmable read-only memory), or any other device capable of storing data.

"I/O device" herein may be and/or include a device capable of providing an interface between a processor and an external device capable of inputting and/or outputting binary data.

"Network interface controller" (NIC) herein may be and/or include a computer hardware component that connects a computer to a computer network. An NIC may include electronic circuitry required to communicate with other networked devices using specific physical layer and data link layer standards.

The SDN 110 may include one or more computer networks. Each of the computer networks may include various computing devices that may communicate with one another through network switches and other network devices. One or more components of the SDN 110 may perform data path functions. One or more components of the SDN 110 may perform control path functions. A referred to herein, a path may represent a routing path via which data can be forwarded from an origin node to a destination node in the SDN 110. The SDN 110 may implement an architecture that decouples the network control and forwarding functions, thus enabling the network control to become directly programmable and the underlying infrastructure to be abstracted for applications and network services. In certain implementations, SDN 110 may separate the control plane of a network from the data plane of the network. The control plane of the network sets policies that control the flow of traffic through components of the network. Each of the components of the network may be regarded as a node of the network. Components in the data plane of the network use the policies set by the control plane to distribute traffic in the network. The control plane of an SDN may include a network controller 120 that sets the policies of the network and provides the policies to components in the data plane. The network controller 120 may be operated at a single network location to provide control of switches throughout the network or may be co-located with a switch to reduce latency in instructions from the controller to the switchers.

Some components in the data plane of the SDN 110 may be network switches that receive packets and forward them based on the contents of the packet. Switches may determine how to distribute packets based on a distribution table that includes entries that may match components of a packet. Switches may inspect the header of a packet to determine if the header of the packet matches an entry in the distribution table. some embodiments, one or more switches the SDN 110 may be implemented as virtual switches. A virtual switch provides a software emulation of a physical switch. In an illustrative example, virtual switches may provide communication with virtual machines through virtual rather than physical switches. The virtual machines interface with the virtual switch through ports on the virtual switch and virtual network interface cards of the virtual machines. The virtual switch may forward communications from a virtual machine to another location on the virtual network such as another virtual machine. The virtual switch may also connect to a physical network interface card to provide access to a physical network for the virtual machines.

A virtual switch operating on a computer system may have a distribution table including various entries that define packet forwarding rules. As a packet is received by the virtual switch, it is analyzed by the virtual switch to determine if certain fields of the packet match one or more parameters in the matching table. If a matching entry is identified, the switch performs an action specified by the entry. For example, the distribution table may have an entry indicating a port for forwarding the packet if it matches the parameters of the entry. In certain situations, a packet may match more than one entry in a distribution table. The virtual switch may determine which rule to implement if a packet matches multiple entries in a distribution table based on priorities of the entries. For example, each entry in a distribution table may have an associated priority. In some implementations, a virtual switch may have more than one distribution table. A virtual switch may apply multiple distribution tables in a logical order based on matching and actions taken according to a previous distribution table in a chain of distribution tables.

A virtual switch may receive some packets that do not match an entry in a distribution table. If the virtual switch does not have an entry matching a particular packet, the packet may be forwarded to a network controller to determine how to process the packet. The virtual switch may also forward packets to the network controller if the packets are addressed to the network controller 120. The network controller 120 may have access to additional rules or policies that are not available to the switch. For example, the network controller 120 may receive instructions from various applications that describe policies for the network. The network controller 120 may also have information on network of additional components of the SDN 110. Thus, the network controller 120 may make a determination on how to process a packet and return the packet and directions for processing the packet back to the switch. In certain situations, the network controller 120 may send a modified packet to the virtual switch, a new packet to the virtual switch, or may not send a packet to the virtual switch.

In some embodiments, the network controller may be executed on the same computer system as the virtual switch. Thus, the virtual switch may forward packets to the network controller 120 without sending the packet over a network. For example, the network controller 120 may be executed as an application or a virtual machine on the local computer system. The virtual switch may communicate with the network controller 120 by sending packets to a virtual network interface card associated with a virtual machine executing the network controller application. In some implementations, the computer system may execute the network controller as an application in the user-space of a host computer system and the virtual switch may forward packets to the network controller through a socket or a shared file.

The SDN profiling server 130 may generate profile information of the SDN 110. The profile information of the SDN 110 may include any information about a current configuration of the SDN 110, such as information about one or more nodes of the SDN 110 (e.g., IP addresses of the network switches and/or any other component of the SDN 110), presence or absence of a connection between two or more of the nodes, current packet forwarding rules and/or policies implemented in the SDN 110, one or more distribution tables defining the rules and/or policies, and/or any other suitable information related to networking capabilities and statistics of the SDN 110. The profile information may represent a snapshot of the current configuration of the SDN.

The profile information may be acquired from the network controller 120 or any other suitable device that can provide the profile information. In some embodiments, the SDN profiling component 135 can generate one or more files including the profile information (also referred to as the "first files"). Each of the first files may be a text file, such as a comma-separated values (CSV) file.

The SDN profiling server 130 can provide the profile information of the SDN 110 to one or more components of system 100 for processing. For example, the profile information of the SDN 110 and/or the first files may be transmitted to the analysis server 140. The analysis server 140 may include an analysis component 145 that can process the profile information of the SDN 110 and generate one or more quantum instructions in view of the profile information. For example, the analysis component 145 can convert the first file(s) into one or more second files that can be processed by quantum computers. Each of the second files may be, for example, a quantum assembly file including one or more quantum instructions (e.g., a file as described in connection with FIG. 10). The quantum assembly file may be, for example, a QASM file. The second files may include quantum instructions for implementing an optimization algorithm that optimizes one or more aspects of the SDN 110. In some embodiments, the analysis component 145 may perform various operations discussed herein with reference to FIGS. 2, 3, and 8.

The analysis component 145 can also transmit the second files to the quantum computer system 150 for processing. The quantum computer system 150 may include a networking optimization component 155 that can perform optimization for the SDN 110. The networking optimization component 155 may receive the second files and may execute the second files (e.g., QASM files encoding the optimization algorithm) to generate one or more optimization results. The optimization results may include, for example, information about an optimal path of data across a plurality of nodes of the SDN 110 (e.g., network switches). The networking optimization component 155 can cause the SDN 110 to be reconfigured in view of the optimization results. For example, the networking optimization component 155 can transmit the optimization results and/or the configuration files to the network controller 120. In some embodiments, the SDN profiling component 135 and/or the analysis server 140 can perform the profiling and analysis functions as described above in response to detecting a triggering event and/or periodically. The triggering event may indicate a modification of the SDN 110 (e.g., a new network switch added to the SDN, a new service route, etc.), a user request, or any other suitable event that may trigger reconfiguration of the SDN 110.

Upon receiving the optimization results, the SDN controller component 125 can configure the SDN 110 in view of the optimization results. For example, the SDN controller component 125 may convert the optimization results into a format that can be consumed by the SDN 110 (e.g., one or more scrips that can be processed the SDN 110 and/or the network controller 120). In some embodiments, the SDN controller component 125 can create a new configuration file with the optimization results (e.g., the optimal paths) and can deploy a new SDN in view of the new configuration file. In some embodiments, the SDN 110 may be reconfigured and/or deployed in real time.

Accordingly, the optimization mechanisms disclosed herein perform networking optimization by evaluating possible paths in an SDN using quantum computing. This may provide cost-effective, simplified, and high frequency optimization of a running SDN, resulting in accurate and efficient networking optimization with an auto deploy option to reconfigure the SDN in real time.

Figure 2:
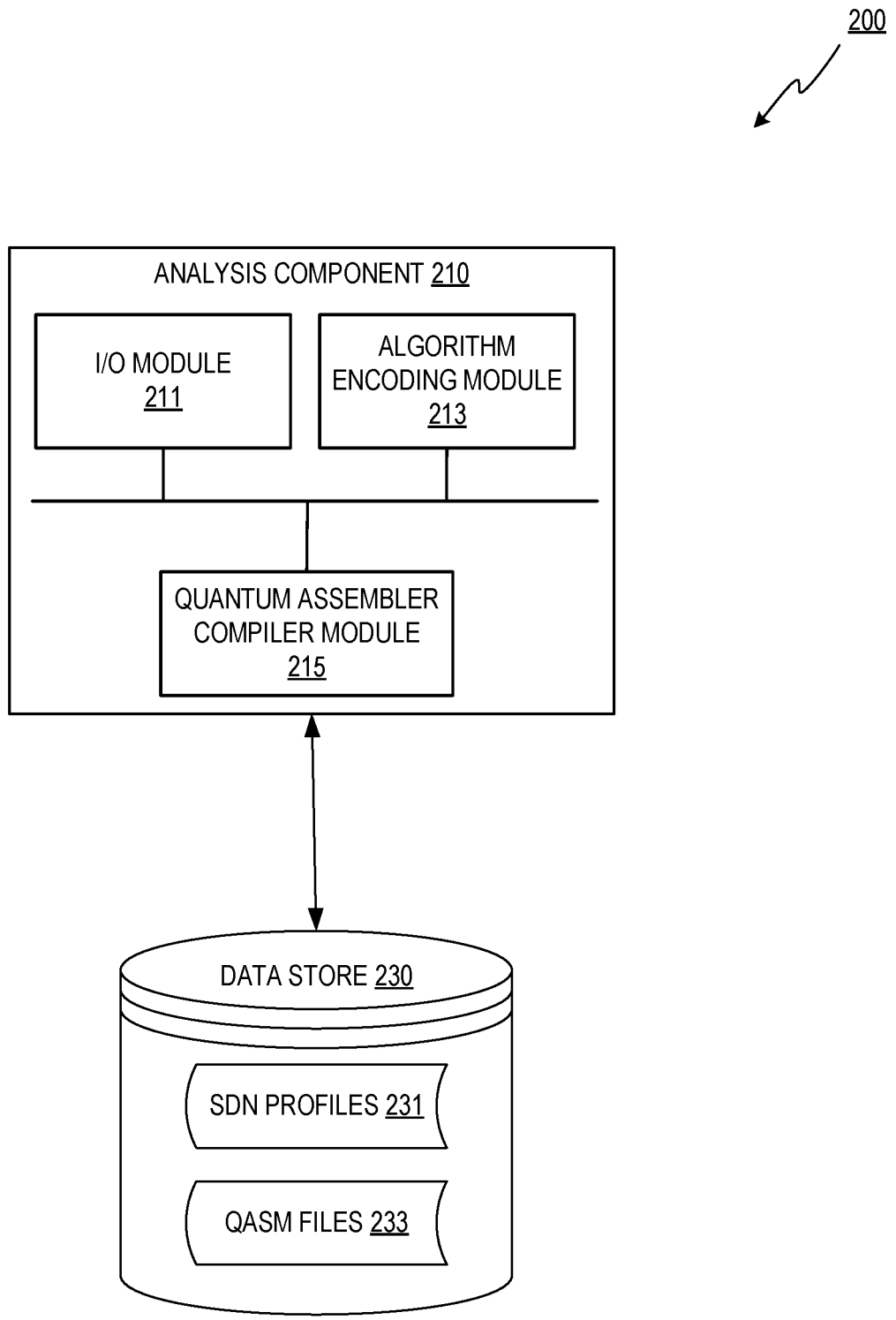
FIG. 2 is a block diagram of a detailed view of a computer system implementing an analysis component according to an implementation of the disclosure.

FIG. 2 depicts a block diagram illustrating an example 200 of a computer system in accordance with some implementations of the disclosure. The computer system 200 may include an analysis component 210. The analysis component 210 and of FIG. 2 may be same as the analysis 135 of FIG. 1. As illustrated, the analysis component 210 may include an input/output (I/O) component 211, an algorithm encoding module 213, and a quantum assembler compiler module 215. The analysis component 210 may communicate with a data store 230 storing data that can be used to perform networking optimization in accordance with the present disclosure (e.g., SDN profiles 231, QASM files 233, etc.). More or less components may be included without loss of generality. For example, two or more of the components or portions of the components may be combined into a single component, or one of the components may be divided into two or more modules. In one implementation, one or more of the modules may be executed by different processing devices on different computing devices (e.g., different server computers).

The I/O module 211 can receive profile information of an SDN. The profile information of the SDN may include any information about a current configuration of the SDN, such as information about one or more nodes of the SDN (e.g., IP addresses of the nodes), presence or absence of a connection between two or more of the nodes, current packet forwarding rules and/or policies implemented in the SDN, one or more distribution tables defining the packet forwarding rules and/or policies, and/or any other suitable information related to networking capabilities and statistics of the SDN.

The profile information may be received via receiving one or more files including the profile information (also referred to as the "first files"). In some embodiments, each of the first files may be a text file including the profile information. The first files may be in any suitable format for representing the profile information, such as a CSV format. The I/O module 211 may process the first file(s) and extract the profile information from the first file(s) (e.g., by parsing the first file(s) into data fields including the profile information and extracting data in the data fields).

The algorithm encoding module 213 can process the profile information of the SDN and generate an optimization algorithm for optimizing configurations of the SDN. The optimization algorithm may be executed by a quantum computer system to determine an optimal path for forwarding data in the SDN. The optimization algorithm may be defined by a plurality of quantum gates and initial values of one or more qubits. The implementation of the algorithm may end with a measurement, collapsing a quantum computer system of N qubits into one of $2^N$ states, where each of the qubits is zero or one. An edge in the SDN may be represented by one or more of the quantum gates. For example, enabling a first edge connecting a first node and a second node in the SDN may correspond to performing one or more operations employing one or more quantum gates (also referred to as the "first quantum gates"). Disabling the first edge in the SDN may be simulated by turning off the first quantum gates (e.g., by flipping the state of the first quantum gate(s)) during the execution of the optimization algorithm. The first edge may be regarded as being enabled when data can be forwarded from the first node to the second node. When the first edge is disabled, data is be forwarded from the first node to the second node.

As such, each possible edge in the SDN may be represented using one or more quantum gates. Generation of possible paths in the SDN may thus be simulated by selectively employing one or more of the quantum gates corresponding to possible edges during the execution of the optimization algorithm. Each of the possible paths may represent a routing path via which data can be forwarded from an origin node to a destination node in the SDN. For example, generating a first path between a first node and a second node of the SDN may correspond to employing one or more first quantum gates to simulate one or more first edges that connect the first node, the second node, and/or one or more other nodes of the SDN. As another example, generating a second path between the first node and the second node of the SDN may correspond to employing one or more second quantum gates to simulate one or more second edges that connect the first node, the second node, and/or one or more other nodes of the SDN.

The optimization algorithm may also involve selecting one or more of the possible paths as optimal paths. The selection can be made by identifying one or more of the possible paths that satisfy one or more conditions. As an example, the conditions may include minimizing a cost of routing traffic through a node, an edge, or a given path defined by a cost function. As another example, the conditions may include one or more resource constraints, such as bandwidth constraints of one or more nodes and/or one or more links connecting the nodes, processing capacities of one or more nodes, memory capacities of one or more nodes, etc. As a further example, the conditions may include that a limit on a distance between an origin of a path and a destination of the path (e.g., a hop limit defining the maximum number of hops in the path).

In some embodiments, the selection of the optimal paths may be made utilizing the Grover's algorithm that searches for a specified entry (e.g., an entry of specified features) in an unordered data set of N entries, using just $$\sqrt[N]{O}$$

queries.

The quantum assembler compiler module 215 can generate one or more files encoding the optimization algorithm for execution (also referred to as the "second files") by a quantum computer system. Each of the second files may include one or more quantum instructions for implementing the optimization algorithm. Each of the second files may be in any suitable format executable by the quantum computer system. The second files may be generated, for example, by translating source code representing the optimization algorithm from a high-level programming language to a quantum assembly language (e.g., QASM).

The I/O module 211 can then transmit the second files and/or the quantum instructions to one or more other devices for further processing. For example, the second files may be transmitted to a quantum computer system for execution.

Figure 3:
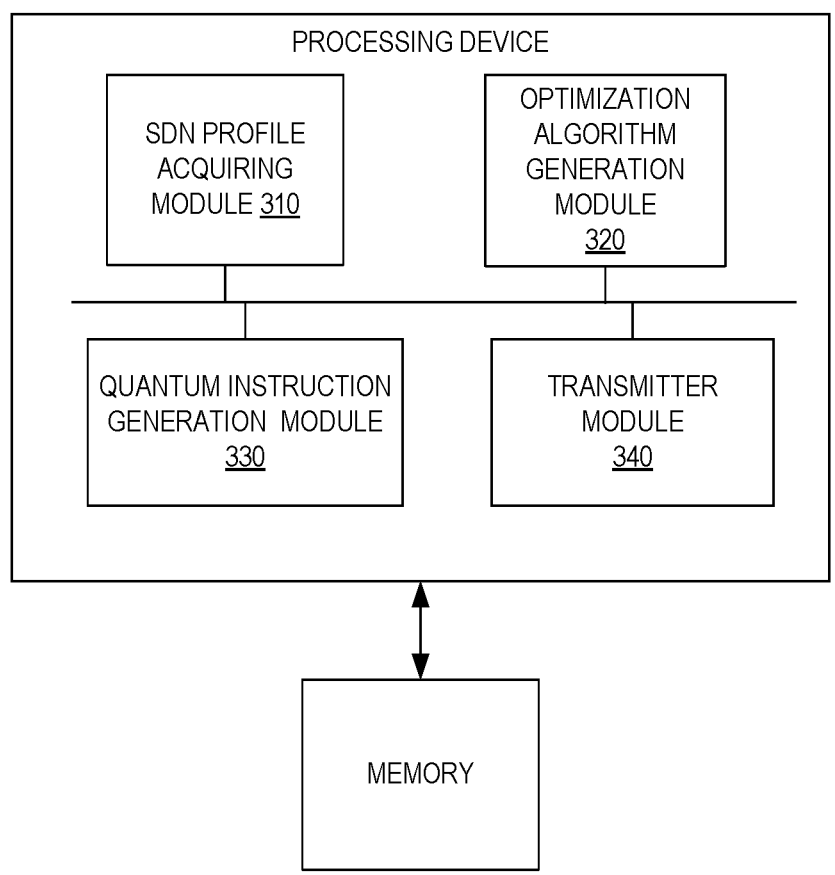
FIGS. 3, 4, and 5 depict block diagrams of example computer systems operating in accordance with one or more aspects of the present disclosure.
Figure 4:
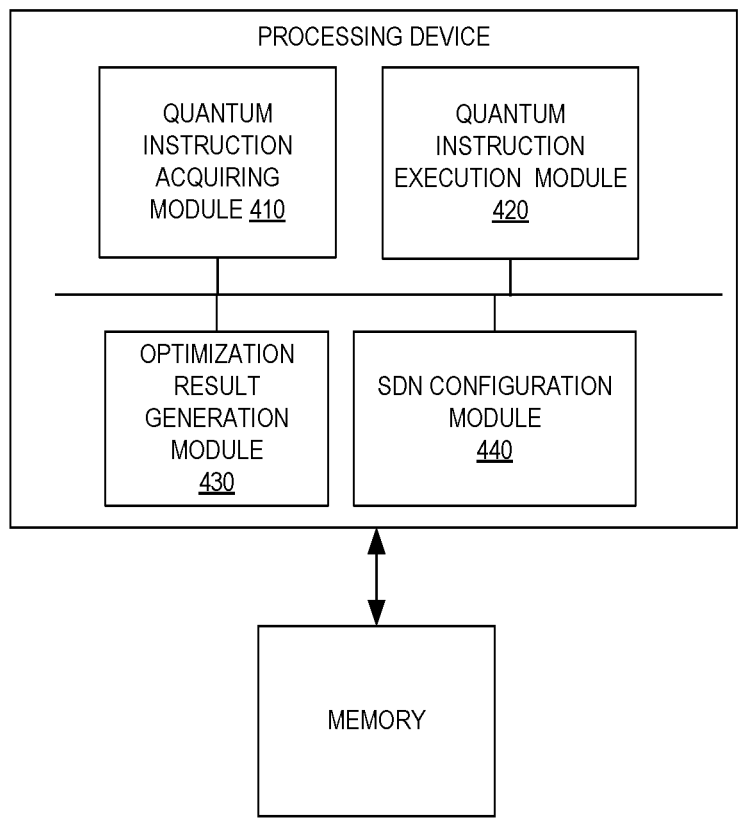
Figure 5:
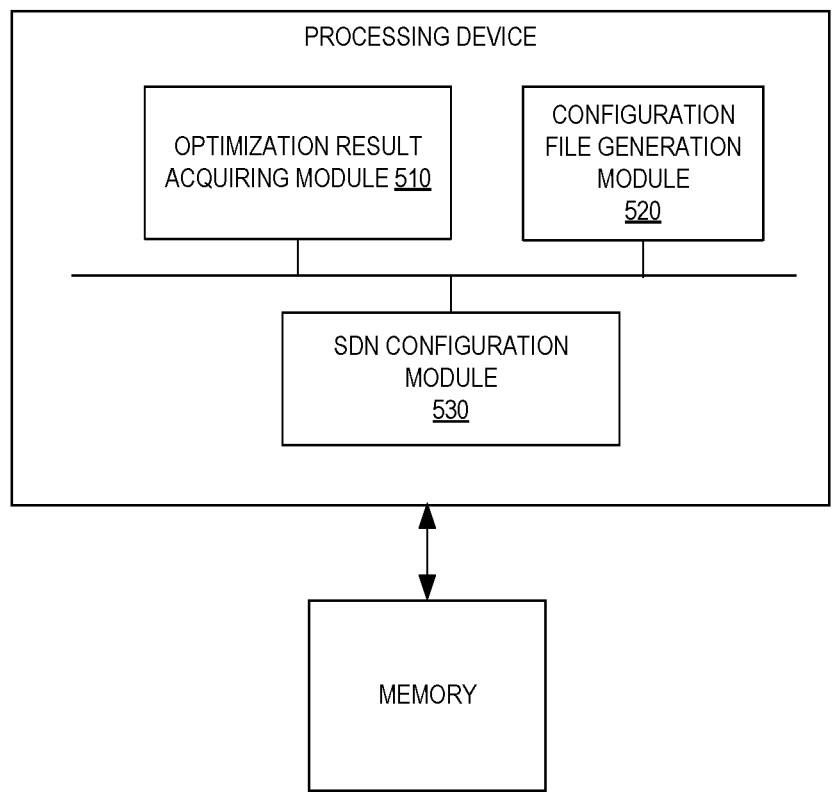

FIGS. 3, 4, and 5 depict block diagrams of example computer systems operating in accordance with one or more aspects of the present disclosure. Each of computer systems 300, 400, and 500 may be the same or similar to computer system 100 and may include one or more processing devices and one or more memory devices. Each of computer systems 300, 400, and 500 may further include a memory storing data that can be used to implement various embodiments of the present disclosure.

Referring to FIG. 3, computer system 300 may include an SDN profile acquiring module 310, an optimization algorithm generation module 320, a quantum instruction generation module 330, and a transmitter module 340.

The SDN profile acquiring module 310 may acquire profile information of a software defined network (SDN). In some embodiments, the profile information may be acquired by receiving one or more files including the profile information (e.g., CSV files). The profile information of the SDN may include any suitable information related to a current configuration of the SDN, such as information about one or more nodes of the SDN (e.g., IP addresses of the network switches), presence or absence of a connection between two or more of the nodes, current packet forwarding rules and/or policies implemented in the SDN, one or more distribution tables defining the rules and/or policies, and/or any other suitable information related to networking capabilities and statistics of the SDN. The profile information may represent a snapshot of the current configuration of the SDN. In some embodiments, the SDN profile acquiring module 310 may acquire the profile information in response to detecting a triggering event. The triggering event may indicate a modification of the SDN (e.g., a new network switch added to the SDN, a new service route, etc.), a user request, or any other suitable event that may trigger reconfiguration of the SDN.

The optimization algorithm generation module 320 can generate, in view of the profile information, an optimization algorithm for optimizing the SDN. The optimization algorithm may be executable by a quantum computer system. The optimization algorithm may include a plurality of quantum gates corresponding to a plurality of edges in the SDN. Each of the plurality of edges may represent a possible connection between two nodes of the SDN. The optimization algorithm may include generating a plurality of possible paths in the SDN using the quantum gates (e.g., by selectively employing one or more of the quantum gates corresponding to the edges). The optimization algorithm also involves selecting one or more of the possible paths as optimal paths. The selection can be made by identifying one or more of the possible paths that satisfy one or more predetermined conditions (e.g., a minimized cost, one or more resource constraints, a hop limit, etc.) as an optimal path. In some embodiments, the selection of the optimal path may be made using one or more quantum algorithms employing one or more quantum gates. The quantum algorithms may include, for example, an algorithm for searching for a specified entry (e.g., an entry of specified features) in an unordered data set, such as the Grover's algorithm. In some embodiments, the optimization algorithm generation module 320 may generate the optimization algorithm in response to detecting the triggering event.

The quantum instruction generation module 330 can generate a plurality of quantum instructions for implementing the optimization algorithm. Each of the quantum instructions may be an instruction that can be executed by a quantum computer system. In some embodiments, the quantum instruction generation module 330 may generate the plurality of quantum instructions by translating source code representing the optimization algorithm from a high-level programming language to a quantum assembly language (e.g., QASM). The quantum instruction generation module 330 may generate one or more quantum assembly files (e.g., QASM files) encoding the optimization algorithm.

The transmitter module 340 can transmit the plurality of quantum instructions to a quantum computer system for execution. The quantum instructions may be transmitted by transmitting the one or more quantum assembly files including the quantum instructions.

Referring to FIG. 4, computer system 400 may include a quantum instruction acquiring module 410, a quantum instruction execution module 420, an optimization result generation module 430, and an SDN configuration module 440.

The quantum instruction acquiring module 410 may acquire one or more quantum instructions for implementing an optimization algorithm for optimizing an SDN. In one implementation, the quantum instruction acquiring module 410 can generate the quantum instructions by performing one or more operations as described in connection with FIGS. 3 and 6. In another implementation, the quantum instruction acquiring module 410 can receive the quantum instructions. The quantum instructions may be generated as described in connection with block 630 of FIG. 6 above. In some embodiments, the quantum instructions may be received by receiving one or more input files including the quantum instructions. The input files may be quantum assembly files executable by a quantum computer system.

The quantum instruction execution module 420 can execute the quantum instructions using a quantum computer system. For example, the quantum computer system can execute the input files and can produce one or more outputs.

The optimization result generation module 430 can generate one or more optimization results representative of an optimized configuration of the SDN. The optimization results may correspond to the outputs of the execution of the quantum instructions. The optimization results may include, for example, one or more optimal paths for forwarding data in the SDN.

In some embodiments, generating the optimization results may include generating one or more configuration files including the optimization results. The configuration files can be in any suitable format that can represent configurations of the SDN, such as a YAML (Ain't Markup Language) file.

The SDN configuration module 440 can cause the SDN to be reconfigured in view of the optimization results. For example, the SDN configuration module 440 can provide the one or more optimization results to a network controller that controls the SDN (e.g., by transmitting the configuration files including the optimization results). The SDN configuration module 440 can also provide one or more instructions for implementing the optimization results (e.g., instructions for modifying and/or recreating the SDN in view of the optimization results).

Referring to FIG. 5, computer system 500 may include an optimization result acquiring module 510, a configuration file generation module 520, and an SDN configuration module 530.

The optimization result acquiring module 510 can obtain one or more optimization results representative of an optimized configuration of a software defined network ("SDN"). The optimization results may include, for example, one or more optimal paths for forwarding data in the SDN. The optimization results may be produced using a quantum computer system. In one implementation, the optimization results may be obtained by performing one or more operations described in connection with FIGS. 6-7 above. In another implementation, the optimization results may be obtained by receiving one or more input files (e.g., YAML files) including the optimization results from the SDN configuration module 440 of FIG. 4 or any other device that is capable of providing the optimization results.

The configuration file generation module 520 can generate one or more configuration files including the optimization results (e.g., by converting the input files into a format that can be consumed by the SDN).

The SDN configuration module 530 can configure the SDN using the configuration files. In one implementation, the SDN configuration module 530 can modify the SDN in view of the configuration files to implement the optimization results (e.g., the optimal paths). In another implementation, the SDN configuration module 530 can deploy a new SDN and configure the new SDN in view of the configuration files.

Figure 6:
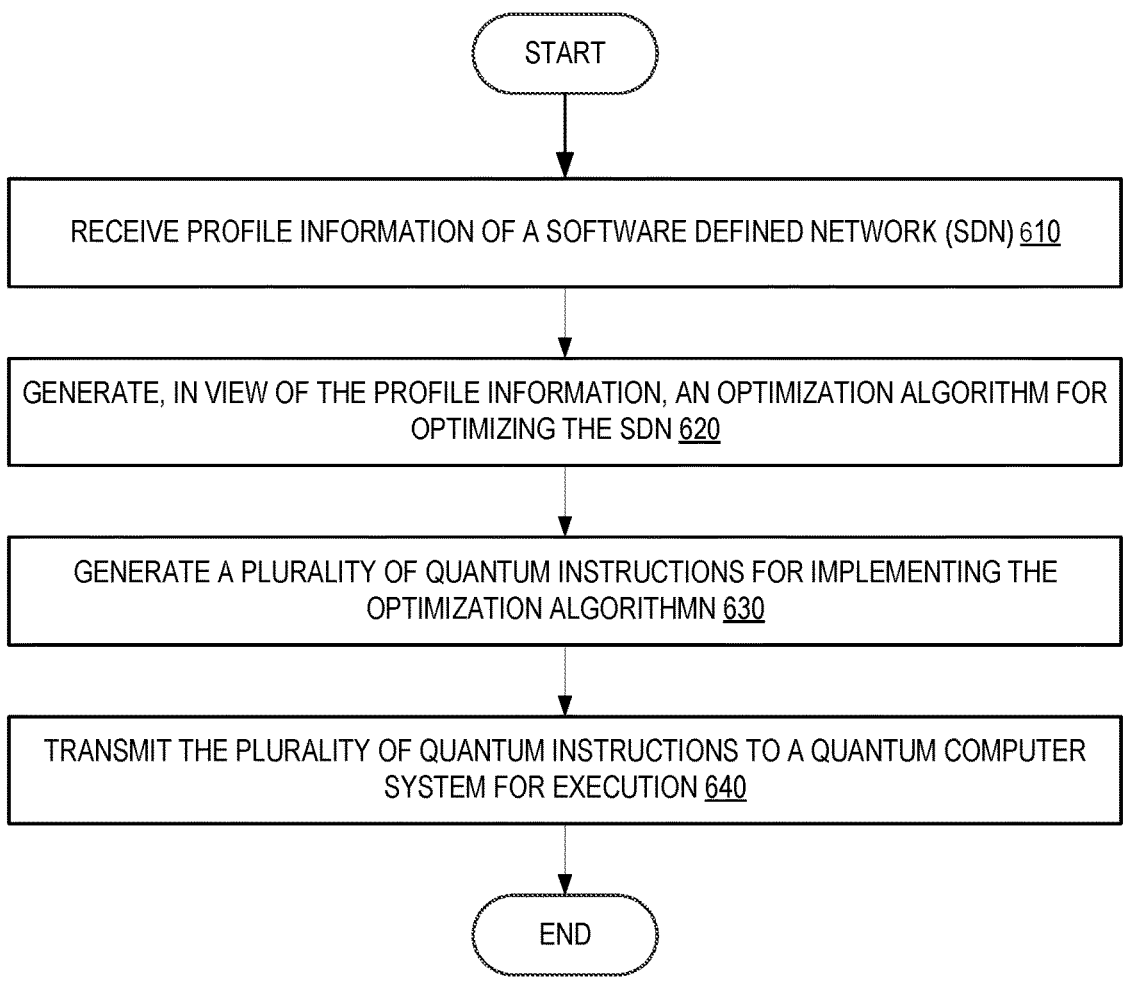
FIG. 6 is a flow diagram illustrating a method for profiling a software defined network in a computer system in accordance with some embodiments of the present disclosure.
Figure 7:
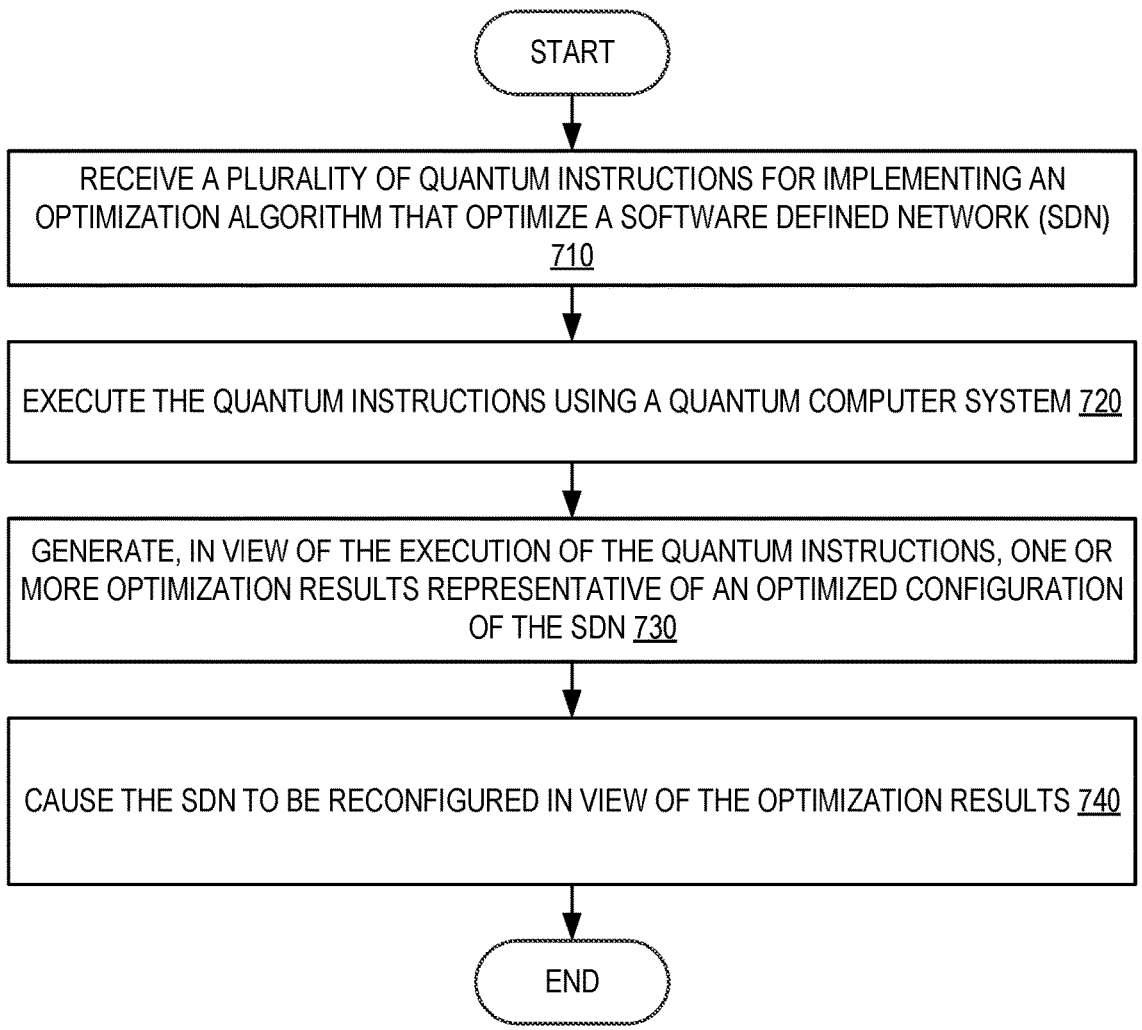
FIG. 7 is a flow diagram illustrating a method for providing optimization results for a software defined network using quantum computing in accordance with some embodiments of the present disclosure.
Figure 8:
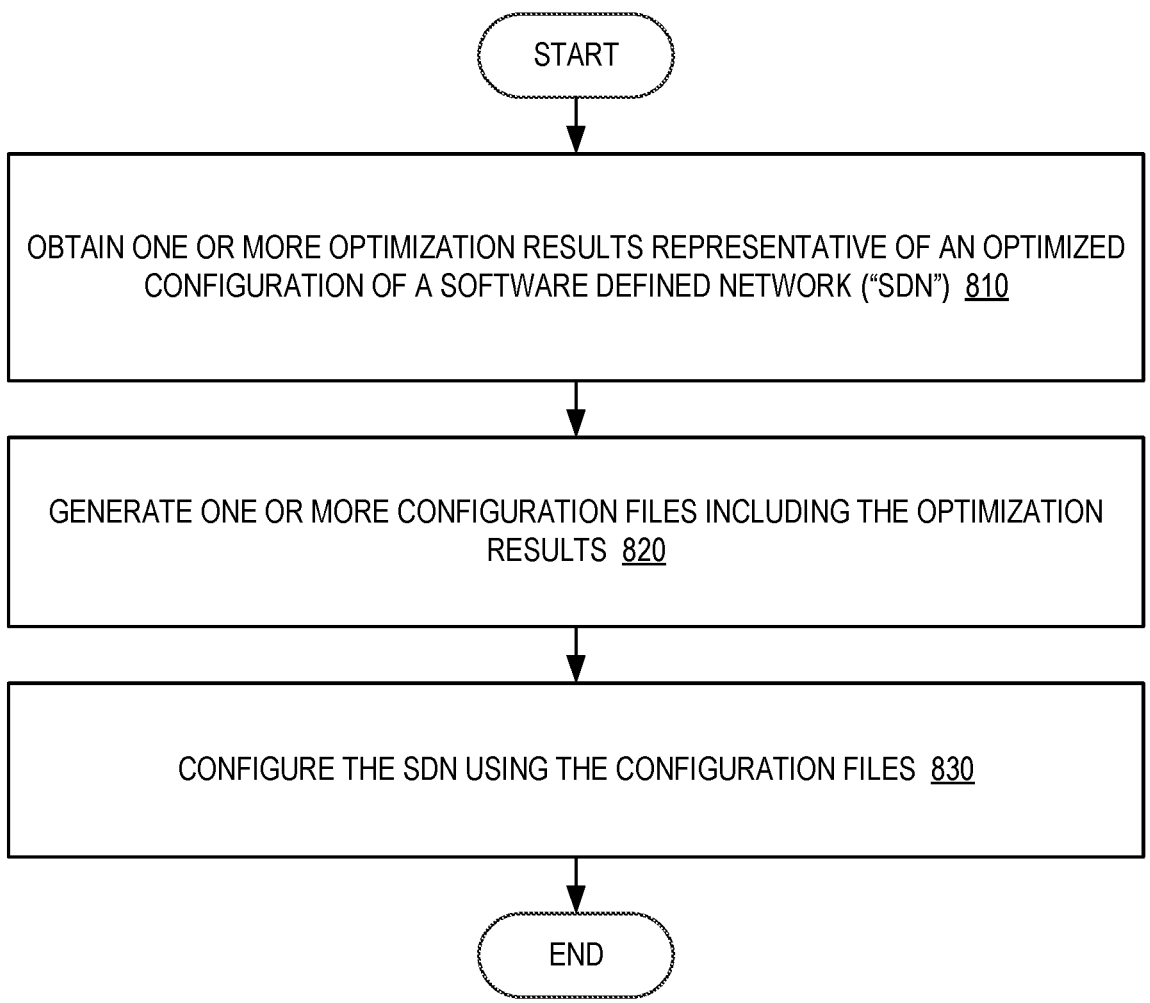
FIG. 8 is a flow diagram illustrating a method for optimizing a software defined network in accordance with some embodiments of the present disclosure.

FIGS. 6, 7, and 8 are flow diagrams illustrating methods 600, 700, and 800 for providing a quantum hardware and software recommendation service in accordance with one or more aspects of the present disclosure. Method 600 illustrates an example process for profiling a software defined network in accordance with some embodiments of the present disclosure. Method 700 illustrates an example process for providing optimization recommendations for a software defined network using quantum computing in accordance with some embodiments of the present disclosure. Method 800 illustrates an example process for optimizing a software defined network in accordance with some embodiments of the present disclosure. Methods 600, 700, and 800 may be performed by processing devices that may comprise hardware (e.g., circuitry, dedicated logic, programmable logic, microcode, etc.), executable code (such as is run on a general-purpose computer system or a dedicated machine), or a combination of both. Methods 600, 700, and 800 and each of their individual functions, routines, subroutines, or operations may be performed by one or more processors of the computer device executing the method. In certain implementations, methods 600, 700, and 800 may each be performed by a single processing thread. Alternatively, methods 600, 700, and 800 may be performed by two or more processing threads, each thread executing one or more individual functions, routines, subroutines, or operations of the method. In an illustrative example, the processing threads implementing methods 600, 700, and 800 may be synchronized (e.g., using semaphores, critical sections, and/or other thread synchronization mechanisms). Alternatively, the processes implementing methods 600, 700, and 800 may be executed asynchronously with respect to each other.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or memory page media. In one implementation, methods 600, 700, and 800 may be performed by computer system 100 as shown in FIG. 1.

Refereeing to FIG. 6, method 600 begins at block 610 where a processing device may receive profile information of a software defined network (SDN). The profile information of the SDN may include any suitable information related to a current configuration of the SDN, such as information about one or more nodes (e.g., IP addresses of the nodes), presence or absence of a connection between two or more of the nodes, current packet forwarding rules and/or policies implemented in the SDN, one or more distribution tables defining the rules and/or policies, and/or any other suitable information related to networking capabilities and statistics of the SDN. The profile information may represent a snapshot of the current configuration of the SDN.

In some embodiments, the profile information may be received by receiving one or more files including the profile information of the SDN (the "first files"). Each of the first files may be, for example, a text file (e.g., a CSV file). The processing device may parse the first files into a plurality of data fields and can extract data from the data fields from the first files to obtain the profile information.

At block 620, the processing device can generate, in view of the profile information, an optimization algorithm for optimizing the SDN. The optimization algorithm may be executable by a quantum computer system. The optimization algorithm may include a plurality of quantum gates corresponding to a plurality of edges in the SDN. Each of the plurality of edges may represent a possible connection between two nodes of the SDN. For example, the presence of a first edge connecting a first node and a second node in the SDN may correspond to performing one or more operations employing one or more quantum gates (also referred to as the "first quantum gates"). The absence of the first edge in the SDN may be simulated by turning off the first quantum gates (e.g., by flipping the state of the first quantum gate(s)) during the execution of the optimization algorithm. The presence of the first edge may represent that data can be forwarded from the first node to the second node. The absence of the first edge may represent that data is not forwarded from the first node to the second node.

The optimization algorithm may include generating a plurality of possible paths in the SDN using the quantum gates (e.g., by selectively employing one or more of the quantum gates corresponding to the edges). For example, generation of a first path between a first node and a second node of the SDN may correspond to employing one or more first quantum gates to simulate one or more first edges that connect the first node, the second node, and/or one or more other nodes of the SDN. As another example, generation of a second path between the first node and the second node of the SDN may correspond to employing one or more second quantum gates to simulate one or more second edges that connect the first node, the second node, and/or one or more other nodes of the SDN.

The optimization algorithm also involves selecting one or more of the possible paths as optimal paths. The selection can be made by identifying one or more of the possible paths that satisfy one or more predetermined conditions (e.g., a minimized cost, one or more resource constraints, a hop limit, etc.) as an optimal path. In some embodiments, the selection of the optimal path may be made using one or more quantum algorithms employing one or more quantum gates. The quantum algorithms may include, for example an algorithm for searching for a specified entry (e.g., an entry of specified features) in an unordered data set, such as the Grover's algorithm. In some embodiments, the optimization algorithm may be generated in response to detecting a triggering event (e.g., a modification of the SDN, a user request, etc.).

At block 630, the processing device can generate a plurality of quantum instructions for implementing the optimization algorithm. Each of the quantum instructions may be an instruction that can be executed by a quantum computer system. In some embodiments, the plurality of quantum instructions may be generated by translating source code representing the optimization algorithm from a high-level programming language to a quantum assembly language (e.g., QASM). Generating the quantum instructions may include generating one or more quantum assembly files (e.g., QASM files) encoding the optimization algorithm.

At block 640, the processing device can transmit the plurality of quantum instructions to a quantum computer system for execution. The quantum instructions may be transmitted by transmitting the one or more quantum assembly files including the quantum instructions.

Referring to FIG. 7, method 700 may start at block 710 where a processing device can receive a plurality of quantum instructions for implementing an optimization algorithm that optimizes a software defined network (SDN). The quantum instructions may be generated as described in connection with block 630 of FIG. 6 above. In some embodiments, the quantum instructions may be received by receiving one or more input files including the quantum instructions. The input files may be quantum assembly files executable by a quantum computer system.

At block 720, the quantum instructions can be executed by a quantum computer system. For example, the quantum computer system can execute the input files and can produce one or more outputs.

At block 730, the processing device can generate one or more optimization results representative of an optimized configuration of the SDN. The optimization results may correspond to the outputs of the execution of the quantum instructions. The optimization results may include, for example, one or more optimal paths for forwarding data in the SDN.

In some embodiments, generating the optimization results may include generating one or more configuration files including the optimization results. The configuration files can be in any suitable format that can represent configurations of the SDN, such as a YAML file.

At block 740, the processing device can cause the SDN to be reconfigured in view of the optimization results. For example, the processing device can provide (e.g., transmit) the one or more optimization results to a network controller that controls the SDN. In some embodiments, providing the one or more optimization results may include transmitting the configuration files including the optimization results. The processing device can also provide one or more instructions for implementing the optimization results (e.g., instructions for modifying and/or recreating the SDN in view of the optimization results).

Referring to FIG. 8, method 800 may start at block 810 where a processing device can obtain one or more optimization results representative of an optimized configuration of a software defined network ("SDN"). The optimization results may include, for example, one or more optimal paths for forwarding data in the SDN. The optimization results may be produced using a quantum computer system. In one implementation, the optimization results may be obtained by performing one or more operations described in connection with FIGS. 6-7 above. In another implementation, the optimization results may be obtained by receiving one or more input files (e.g., YAML files) including the optimization results from the quantum computer system or any other device that is capable of providing the optimization results.

At block 820, the processing device can generate one or more configuration files including the optimization results. For example, the processing device can convert the input files into a format that can be consumed by the SDN. The configuration files can include one or more scripts including the optimization results.

At block 830, the processing device can configure the SDN using the configuration files. In one implementation, the processing device can modify the SDN in view of the configuration files to implement the optimization results (e.g., the optimal paths). In another implementation, the processing device can deploy a new SDN and configure the new SDN in view of the configuration files.

Figure 9:
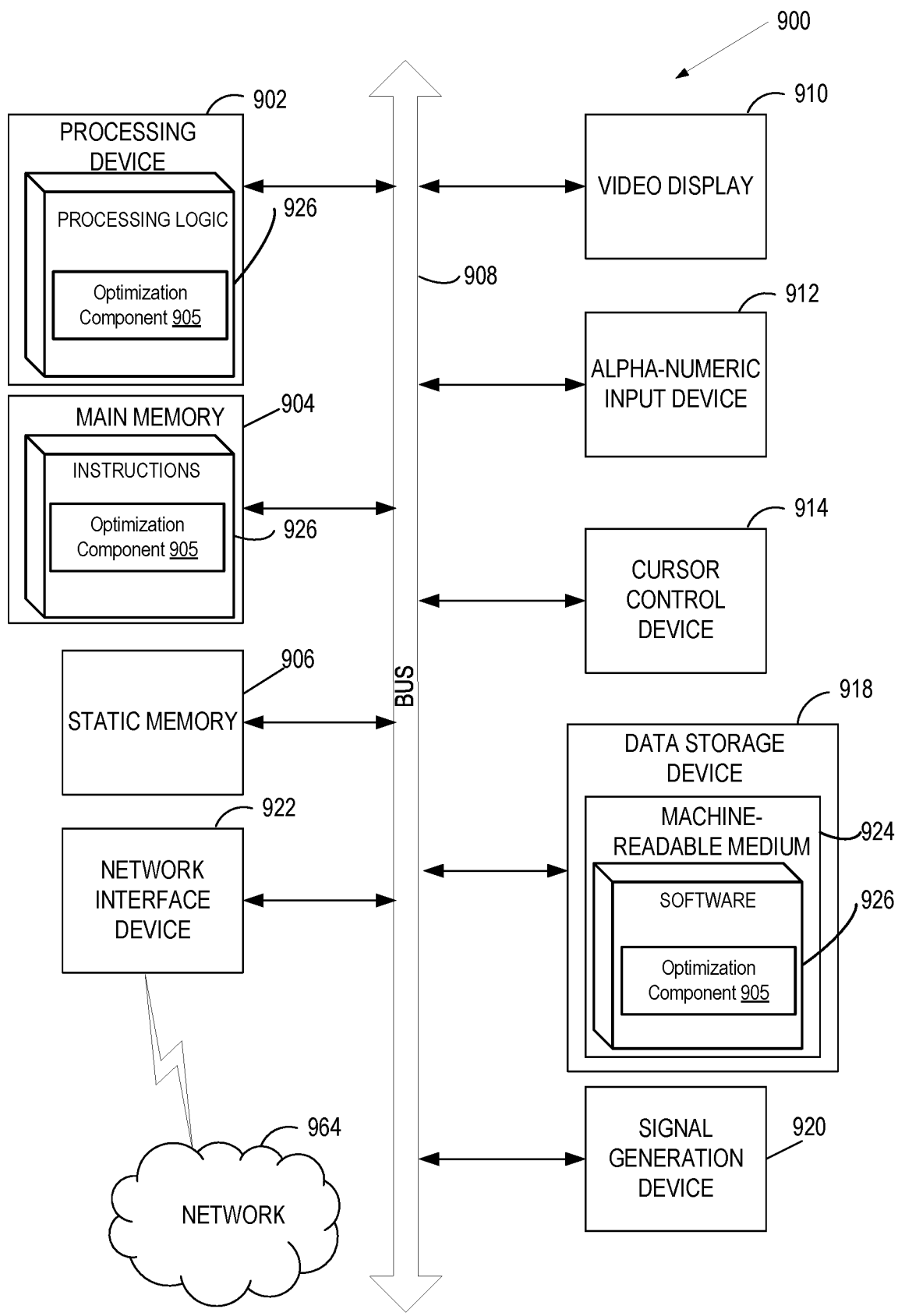
FIG. 9 illustrates a block diagram of one implementation of a computer system in accordance with some embodiments of the present disclosure.

FIG. 9 illustrates a diagrammatic representation of a machine in the example form of a computer system 900 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 900 includes a processing device 902 (e.g., processor, CPU, etc.), a main memory 904 (e.g., read-only memory (ROM), flash memory, dynamic random access memory (DRAM) (such as synchronous DRAM (SDRAM) or DRAM (RDRAM), etc.), a static memory 906 (e.g., flash memory, static random access memory (SRAM), etc.), and a data storage device 918, which communicate with each other via a bus 408.

Processing device 902 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 900 may further include a network interface device 922 communicably coupled to a network 964. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), and a signal generation device 920 (e.g., a speaker).

The data storage device 918 may include a machine-accessible storage medium 924 on which is stored software 926 embodying any one or more of the methodologies of functions described herein. The software 926 may also reside, completely or at least partially, within the main memory 404 as instructions 926 and/or within the processing device 902 as processing logic 926 during execution thereof by the computer system 900; the main memory 904 and the processing device 902 also constituting machine-accessible storage media.

The machine-readable storage medium 924 may also be used to store instructions 926 to implement an optimization component 905 for networking optimization in accordance with the present disclosure. The optimization component 905 may be and/or include the SDN controller component 125, the SDN profiling competent 135, the analysis component 145, and the networking optimization component 155 as described with respect to FIGS. 1 and 2, and/or a software library containing methods that call the above applications. While the machine-accessible storage medium 924 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the disclosure. The term "machine-accessible storage medium" shall accordingly be taken to include, but not be limited to, solid-state memories, and optical and magnetic media.

Referring to FIG. 10, an example 1000 of a quantum assembly file in accordance with some embodiments of the present disclosure is shown. File 1000 may include one or more instructions for implementing an algorithm that sets two qubits in an entangled state (e.g., instructions 1011, 1013, 1015, 1017, 1019, etc.). Each of the instructions may be a quantum instruction that can be executed by a quantum computing device. As illustrated, file 1000 may include an instruction 1011 defining a qubit size (e.g., a number of qubits) to be used to implement the algorithm. File 1000 may also include one or more instructions including information about one or more quantum gates to be used to execute the algorithm. For example, file 1000 may include an instruction 1013 referring to a library that provides definitions of the quantum gates. As another example, file 1000 may include instructions 1015, 1017, and 1019 that specify the quantum gates to be used to implement the algorithm.

File 1000 may also include one or more comments including metadata that can be used to implement the algorithm. For example, as illustrated in FIG. 10, file 1000 may include a comment 1021 including an activation frequency, a comment 1023 including a modification timestamp, etc.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Other computer system designs and configurations may also be suitable to implement the system and methods described herein. The following examples illustrate various implementations in accordance with one or more aspects of the present disclosure.

Other computer system designs and configurations may also be suitable to implement the system and methods described herein. The following examples illustrate various implementations in accordance with one or more aspects of the present disclosure.

Example 1 is a method including: receiving profile information of a software defined network, wherein the profile information includes information about a current configuration of the software defined network; generating, in view of the profile information, an optimization algorithm for optimizing the software defined network, wherein the optimization algorithm includes a plurality of quantum gates corresponding to a plurality of edges of the software defined network; and generating, by a processing device, a plurality of quantum instructions for implementing the optimization algorithm.

Example 2 includes the subject matter of example 1, wherein receiving the profile information of the software defined network includes receiving at least one text file including the profile information of the software defined network.

Example 3 includes the subject matter of example 2, further including parsing the at least one text file to extract the profile information of the software defined network from the at least one text file.

Example 4 includes the subject matter of example 1, wherein each of the plurality of edges connects an origin node in the software defined network a destination node in the software defined network.

Example 5 includes the subject matter of example 1, wherein the optimization algorithm further includes generating, using the plurality of quantum gates, a plurality of possible paths for forwarding data in the software defined network.

Example 6 includes the subject matter of example 5, wherein the optimization algorithm further includes selecting at least one of the plurality of possible paths as an optimal path.

Example 7 includes the subject matter of example 6, wherein selecting the at least one of the plurality of possible paths as the optimal path includes processing the plurality of possible paths using a quantum algorithm.

Example 8 includes the subject matter of example 1, further including generating a file including the quantum instructions for implementing the optimization algorithm, wherein the file is executable by a quantum computer system.

Example 9 includes the subject matter of example 8, wherein the file includes a quantum assembly file.

Example 10 includes the subject matter of example 1, further including transmitting the plurality of quantum instructions to a quantum computer system.

Example 11 includes the subject matter of example 1, wherein the profile information includes information of a plurality of nodes of the software defined network.

Example 12 includes the subject matter of example 1, wherein the optimization algorithm is generated in view of detection of a triggering event indicative of a modification of the software defined network.

Example 13 is a method, including: receiving an input file including a plurality of quantum instructions for implementing an optimization algorithm that optimize a current configuration of a software defined network; executing, by a quantum computer system, the input file; and generating, in view of the execution, at least one optimization result representative of an optimized configuration of the software defined network.

Example 14 includes the subject matter of example 13, further including generating at least one configuration file including the optimization result.

Example 15 includes the subject matter of example 14, wherein the configuration file includes a YAML file.

Example 16 includes the subject matter of example 13, further including transmitting the at least one optimization result to a network controller that controls the software defined network.

Example 17 includes the subject matter of example 13, wherein the at least one optimization result includes an optimal path.

Example 18 includes the subject matter of example 13, wherein the plurality of quantum instructions includes a plurality of quantum gates corresponding to a plurality of edges of the software defined network.

Example 19 includes the subject matter of example 13, wherein the input file includes a quantum assembly file.

Example 20 is a method including: obtaining at least one optimization result representative of an optimized configuration of a software defined network, wherein the at least one optimization result is produced using a quantum computer system; generating, by a processing device, one or more configuration files including the optimization result; and configuring the software defined network in view of the configuration files.

Example 21 includes the subject matter of example 20, wherein the at least open optimization result includes an optimal path.

Example 22 includes the subject matter of example 20, wherein obtaining the optimization result includes receiving at least one input file including the optimization result.

Example 23 includes the subject matter of example 22, wherein generating the one or more configuration files including the optimization result includes converting the input file into the configuration files.

Example 24 includes the subject matter of example 20, wherein obtaining the optimization result includes: generating, in view of profile information of the software defined network, an optimization algorithm for optimizing the software defined network; and generating, by a processing device, a plurality of quantum instructions for implementing the optimization algorithm.

Example 25 includes the subject matter of example 24, wherein the profile information of the software defined network includes information of a current configuration of the software defined network.

Example 26 includes the subject matter of example 24, wherein the optimization algorithm includes a plurality of quantum gates corresponding to a plurality of edges in the software defined network.

Example 27 includes the subject matter of example 24, wherein obtaining the optimization result further includes: executing, by the quantum computer system, the plurality of quantum instructions; and generating, in view of the execution, the optimization result.

Example 28 includes the subject matter of example 26, wherein executing the plurality of quantum instructions includes executing a quantum assembly file including the plurality of quantum instructions.

Example 29 includes the subject matter of example 20, wherein configuring the software defined network in view of the configuration files includes deploying a new software defined network in view of the configuration files.

Example 30 is an apparatus including: a processing device; and a means for receiving profile information of software defined network, wherein the profile information includes information about a current configuration of the software defined network; a means for generating, in view of the profile information, an optimization algorithm for optimizing the software defined network; and a means for generating a plurality of quantum instructions for implementing the optimization algorithm.

Example 31 is the apparatus of claim 30, further including the subject matter of any of claims 1-29.

Example 32 is a system comprising: a memory; and a processing device operatively coupled to the memory, the processing device to implement the subject matter of any of examples 1-31.

Example 33 is a non-transitory machine-readable storage medium including instructions that, when accessed by a processing device, cause the processing device to implement the subject matter of any of examples 1-31.

Unless specifically stated otherwise, terms such as "receiving," "transmitting," "processing," "providing," "storing," "performing," "detecting," "analyzing," "obtaining," "generating," "determining," "updating," "modifying," "acquiring," "optimizing," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 600, 700, and 800 and/or each of its individual functions, routines, subroutines, or operations. Examples of the structure for a variety of these systems are set forth in the description above.

The above description is intended to be illustrative, and not restrictive. Although the disclosure has been described with references to specific illustrative examples and implementations, it should be recognized that the disclosure is not limited to the examples and implementations described. The scope of the disclosure should be determined with reference to the following claims, along with the full scope of equivalents to which the claims are entitled.

Whereas many alterations and modifications of the disclosure will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the disclosure.

What is claimed is:

1. A method comprising:
   receiving profile information of a software defined network, wherein the software defined network comprises a plurality of edges and the profile information comprises information about a current configuration of the software defined network;
   generating, in view of the profile information, an optimization algorithm for optimizing the software defined network to identify a plurality of possible paths for forwarding data in the software defined network, wherein the optimization algorithm identifies the plurality of possible paths by:
      enabling a first edge of the plurality of edges by employing a first subset of a plurality of quantum gates; and
      disabling a second edge of the plurality of edges by flipping a state of each of a second subset of the plurality of quantum gates during an execution of the optimization algorithm; and generating, by a processing device, a file executable by a quantum computer system, the file comprising a plurality of quantum instructions for implementing the optimization algorithm, the plurality of quantum instructions comprising a number of qubits to be used by the optimization algorithm.

2. The method of claim 1, wherein the receiving the profile information of the software defined network comprises receiving at least one text file comprising the profile information of the software defined network.

3. The method of claim 2, further comprising parsing the at least one text file to extract the profile information of the software defined network from the at least one text file.

4. The method of claim 1, wherein each of the plurality of edges connects an origin node in the software defined network to a destination node in the software defined network.

5. The method of claim 1, wherein the optimization algorithm further comprises generating, using the plurality of quantum gates, the plurality of possible paths for forwarding data in the software defined network.

6. The method of claim 5, wherein the optimization algorithm further comprises selecting at least one of the plurality of possible paths as an optimal path.

7. The method of claim 6, wherein the selecting the at least one of the plurality of possible paths as the optimal path comprises processing the plurality of possible paths using a quantum algorithm.

8. The method of claim 1, wherein the file comprises a quantum assembly file.

9. The method of claim 1, further comprising transmitting the plurality of quantum instructions to the quantum computer system.

10. The method of claim 1, wherein the profile information comprises information of a plurality of nodes of the software defined network.

11. The method of claim 1, wherein the optimization algorithm is generated in view of detection of a triggering event indicative of a modification of the software defined network.

12. A non-transitory machine-readable storage medium including instructions that, when accessed by a processing device, cause the processing device to:
  receive profile information of a software defined network, wherein the software defined network comprises a plurality of edges and the profile information comprises information about a current configuration of the software defined network;
  generate, in view of the profile information, an optimization algorithm for optimizing the software defined network to identify a plurality of possible paths for forwarding data in the software defined network, wherein the optimization algorithm identifies the plurality of possible paths by:
    enabling a first edge of the plurality of edges by employing a first subset of a plurality of quantum gates; and
    disabling a second edge of the plurality of edges by flipping a state of each of a second subset of the plurality of quantum gates during an execution of the optimization algorithm; and
  generate at least one file including a plurality of quantum instructions for implementing the optimization algorithm, the plurality of quantum instructions comprising a number of qubits to be used by the optimization algorithm.

* * * * *